United States Patent
Wang et al.

(10) Patent No.: US 11,703,888 B2
(45) Date of Patent: Jul. 18, 2023

(54) FULL-AZIMUTH IRRADIATION TRACKING METHOD, DETECTION APPARATUS AND SOLAR TRACKER

(71) Applicant: ARCTECH SOLAR HOLDING CO., LTD., Kunshan (CN)

(72) Inventors: Shitao Wang, Kunshan (CN); Caixia Li, Kunshan (CN)

(73) Assignee: ARCTECH SOLAR HOLDING CO., LTD., Kunshan (CN)

( * ) Notice: Subject to any disclaimer, the term of this patent is extended or adjusted under 35 U.S.C. 154(b) by 169 days.

(21) Appl. No.: 17/441,991

(22) PCT Filed: Mar. 17, 2021

(86) PCT No.: PCT/CN2021/081204
§ 371 (c)(1),
(2) Date: Sep. 22, 2021

(87) PCT Pub. No.: WO2021/190368
PCT Pub. Date: Sep. 30, 2021

(65) Prior Publication Data
US 2022/0308599 A1    Sep. 29, 2022

(30) Foreign Application Priority Data
Mar. 24, 2020   (CN) .......................... 202010212627.9

(51) Int. Cl.
*G05D 3/10* (2006.01)
*H02S 20/32* (2014.01)

(52) U.S. Cl.
CPC .............. *G05D 3/105* (2013.01); *H02S 20/32* (2014.12)

(58) Field of Classification Search
CPC ................................. G05D 3/105; H02S 20/32
See application file for complete search history.

(56) References Cited

U.S. PATENT DOCUMENTS 5,317,145 A  *  5/1994  Corio ...................... F24S 50/20
                                                        136/246

* cited by examiner

*Primary Examiner* — Thanh Luu
(74) *Attorney, Agent, or Firm* — Benesch, Friedlander, Coplan & Aronoff LLP

(57) ABSTRACT

The present invention provides a full-azimuth irradiation tracking method, a detection apparatus, and a solar tracker. The method comprises: acquiring a multi-azimuth irradiation data combination in a full-azimuth irradiation tracking mode; calculating a target tracking angle with a maximum irradiation amount among a plurality of azimuths according to the multi-azimuth irradiation data combination, and rotating the solar tracker according to the target tracking angle; collecting irradiation data at a position reached after the solar tracker is rotated, and calculating and analyzing whether the solar tracker is rotated and reaches a target position corresponding to the target tracking angle; and when the solar tracker is rotated and reaches the target position corresponding to the target tracking angle, controlling the solar tracker to maintain for a preset time at the target position. By means of the described solution, the multi-azimuth irradiation data combination can be obtained in the full-azimuth irradiation tracking mode, and an optimal tracking angle can be obtained by analyzing and determining, so that the solar tracker obtains the maximum irradiation amount and maintains for the preset time, thereby being able to increase a power generation amount.

10 Claims, 9 Drawing Sheets n=3
$R_1$ is a front irradiation amount
$R_4$ is a right irradiation amount
$R_7$ is a back irradiation amount
$R_{10}$ is a left irradiation amount

FULL-AZIMUTH IRRADIATION TRACKING METHOD, DETECTION APPARATUS AND SOLAR TRACKER

FIELD OF TECHNOLOGY

The present invention relates to the field of solar energy tracking, in particular to a full-azimuth irradiation tracking method, a detection apparatus and a solar tracker.

BACKGROUND

With the rapid development of advanced solar panel technology, a bifacial solar panel has been widely concerned and researched due to the high efficiency of power generation on both front and rear sides thereof. During the rotation of the earth, a solar power generation system at a fixed location on the ground is affected by the change of the illumination angle caused by relative motion of the sun around the earth. Generally, it is necessary to use the irradiation detection apparatus for tracking and detecting the irradiation data of the tracking angle.

In the related art, an existing irradiation detection apparatus for a solar power station generally monitors a fixed inclination angle, a horizontal plane and an upper surface of a tracker, and collects a small amount of irradiation angle data at a fixed position, which only meets the requirements of a fixed solar power station to collect irradiation data, but cannot meet the requirements of a tracking solar power station, especially the bifacial panel may involve the irradiation changes of the front and rear sides.

The tracker is an apparatus that dynamically rotates in real time with the position of the sun. As the described technology cannot meet the requirements of the irradiation detection of the tracker, an astronomical algorithm and an inclination angle sensor are usually used for tracking an optimal operation angle, so that the bifacial panel reaches an optimal angle towards the sun. However, such tracking method is only suitable for conditions with strong irradiance on a sunny day. For other weather conditions, such tracking method may not necessarily enable the panel to reach an optimal power generation position. Therefore, how to accurately and effectively acquire an optimal tracking angle so as to improve the efficiency of power generation needs to be solved urgently.

SUMMARY

The present invention provides a full-azimuth irradiation tracking method, a detection apparatus and a solar tracker, in order to solve the problem of how to accurately and effectively acquire an optimal tracking angle so as to improve the efficiency of power generation. The full-azimuth irradiation tracking method, the detection apparatus and the solar tracker can detect irradiation data of a plurality of azimuths so as to obtain an optimal tracking angle, thereby improving the efficiency of power generation.

In order to achieve the described objectives, the present invention is achieved by the following technology:

The present invention provides a full-azimuth irradiation tracking method, comprising: acquiring a multi-azimuth irradiation data combination in a full-azimuth irradiation tracking mode; calculating a target tracking angle with a maximum irradiation amount among a plurality of azimuths according to the multi-azimuth irradiation data combination, and rotating a solar tracker according to the target tracking angle; collecting irradiation data at a position reached after the solar tracker rotates, and calculating and analyzing whether the solar tracker is rotated and reaches a target position corresponding to the target tracking angle; and when the solar tracker is rotated and reaches the target position corresponding to the target tracking angle, controlling the solar tracker to maintain for a preset time at the target position.

Further, after calculating and analyzing whether the solar tracker rotates and reaches the target position corresponding to the target tracking angle, the method comprises: when the solar tracker is rotated and does not reach the target position corresponding to the target tracking angle, recalculating a target tracking angle, and adjusting the position of the solar tracker; and/or; after controlling the solar tracker to maintain for a preset time at the target position, recalculating a target tracking angle, and adjusting the position of the solar tracker.

Further, the method comprises: when shade occurs between solar arrays on the solar tracker, exiting the full-azimuth irradiation tracking mode, and executing a back tracking mode; or; when detecting that front irradiation data exceeds a set value irradiation and a time duration thereof reaches a set value time, exiting the full-azimuth irradiation tracking mode, and entering a conventional tracking mode.

Further, the method comprises: when no shade occurs between the solar arrays on the solar tracker, exiting the back tracking mode, and entering the full-azimuth irradiation mode; or; when detecting that front irradiation data is less than a set value irradiation and a time duration thereof reaches a set value time, exiting the conventional tracking mode, and entering the full-azimuth tracking mode.

Further, calculating a target tracking angle with a maximum irradiation amount among a plurality of azimuths according to the multi-azimuth irradiation data combination comprises: when the tracking angle has a limited range of a rotating angle range x not exceeding 90°, 120° or 150°, calculating a target tracking angle with a maximum irradiation amount among a plurality of azimuths by using the following calculation formulae: when $R_i > R_{2n+i}$, $P_i = \alpha * R_i + \beta * \eta * R_{2n+i}$, wherein $i < n*x < 180$; and when $R_i < R_{2n+i}$, $P_i = \alpha * \eta * R_i + \beta * R_{2n+i}$, wherein $i < n*x < 180$; and when the tracking angle has no range limitation, calculating a target tracking angle with a maximum irradiation amount among a plurality of azimuths by using the following calculation formulae: when $R_i > R_{2n+i}$, $P_i = \alpha * R_1 + \beta * \eta * R_{2n+i}$ when $R_i < R_{2n+i}$, $P_i = \alpha * \eta * R_i + \beta * R_{2n+i}$; and wherein the azimuth i and the azimuth 2n+i are relative azimuths, $R_i$ represents an irradiation amount of the azimuth i, $R_{2n+i}$ represents an irradiation amount of the azimuth 2n+i, $\alpha$ and $\beta$ represent irradiation correction coefficients, $\eta$ represents a bifacial rate, and the maximum value of the tracking angle $P_i$ is set to be $P_{max} = \text{Max}(P_1, P_2, \ldots, P_i, P_{2n+1})$, wherein i=max corresponding to $P_{max}$ is taken as the target tracking angle.

Further, the solar tracker rotating according to the target tracking angle specifically comprises: the rotation angle and the rotation direction of the solar tracker are respectively as follows: the rotation angle is expressed as: $\omega = 90 * \text{max}/n$; the rotation direction is expressed as: when $R_i > R_{2n+i}$, the solar tracker is rotated from the direction $R_1$ to the direction $R_i$; otherwise, the solar tracker is rotated from the direction $R_1$ to the direction $R_{2n+i}$.

The present invention further provides a full-azimuth irradiation detection apparatus applied in a full-azimuth irradiation tracking method, comprising: a plurality of reference cells, used for measuring irradiation data in a plurality of azimuths and mounted on a peripheral side of a rotating main shaft of a solar tracker.

Further, the plurality of reference cells comprise: a plurality of standard reference cells, respectively mounted on the peripheral side of the rotating main shaft of the solar tracker and on the horizontal or vertical position of the rotating main shaft; and a plurality of auxiliary reference cells, respectively mounted on the peripheral side of the rotating main shaft of the solar tracker and between the two standard reference cells.

Further, the apparatus comprises: an inner layer, the inner layer being a first flexible material, being provided on a torus adjacent to the rotating main shaft, and being in clearance fit with the rotating main shaft; an intermediate layer, the intermediate layer being a second flexible material, the plurality of reference cells being distributed on the intermediate layer, the second flexible material having a strength greater than that of the first flexible material; and an outer layer, the outer layer being a transparent material having a self-cleaning function, and the outer layer and the intermediate layer being hollow or filled with a transparent material.

The present invention further provides a solar tracker, wherein a full-azimuth irradiation detection device is mounted on a rotating main shaft of the solar tracker.

The full-azimuth irradiation tracking method, detection apparatus and solar tracker provided by the present invention have at least the following beneficial effects:

1) The multi-azimuth irradiation data combination can be obtained in a full-azimuth irradiation tracking mode, and an optimal tracking angle can be obtained by means of analysis and determination, so that the solar tracker obtains the maximum irradiation amount and maintains for the preset time, thereby being able to increase a power generation amount.

2) In view of the problem that the solar tracker is rotated and does not reach the optimal tracking angle after receiving the optimal tracking angle, the irradiation amount obtained by the solar tracker at the optimal tracking angle is verified; and when the solar tracker is rotated and does not reach the target position corresponding to the target tracking angle, the target tracking angle is recalculated, and the position of the solar tracker is adjusted, thereby being able to avoid the reduction of power generation amount when the solar tracker is rotated and does not reach the target position.

3) As shade may occur between the solar arrays of the solar tracker, in this case, tracking is performed in combination with the full-azimuth irradiation tracking mode and the back tracking mode tracking, thereby avoiding the inaccuracy of the full-azimuth irradiation tracking mode when shade occurs between the solar arrays.

4) Front irradiation data of each time period is different. With regard to front irradiation data of different time periods, tracking is performed in combination with the full-azimuth irradiation tracking mode and the conventional tracking mode; and when detecting that front irradiation data exceeds a set value irradiation and a time duration thereof reaches a set value time, the full-azimuth irradiation tracking mode is exited, and the conventional tracking mode is entered.

5) When calculating the target tracking angle, the tracking angle has a limited range. In view of the possible problems, the described solution provides a method for calculating the tracking angle having a limited range or having no range limitation, and fully considers different conditions in the calculation of the target tracking angle.

6) In the full-azimuth irradiation detection apparatus provided in the present solution, the plurality of reference cells are used for measuring irradiation data in the plurality of azimuths, which can comprehensively acquire the irradiation data and obtain the accurate optimal tracking angle, thereby improving the power generation amount. The arrangement of the reference cells facilitates the collection of the irradiation data and the subsequent calculation of the tracking angle.

7) In the present solution, the inner layer of the full-azimuth irradiation detection apparatus adopts a flexible material, and such a design can randomly accommodate main beams having different shapes, improving the applicability of the full-azimuth irradiation detection apparatus; the middle layer of the full-azimuth irradiation detection apparatus also adopts a flexible material having a certain strength, facilitating the mounting and adjustment of the reference cells; and the outer layer of the full-azimuth irradiation detection apparatus is a transparent material having a self-cleaning function, and such a design can ensure that the reference cells comprehensively detect the irradiation data, and can avoid the regional shade of the outer layer due to environmental reasons, thereby affecting the accuracy of the irradiation data detected by the full-azimuth irradiation detection apparatus.

BRIEF DESCRIPTION OF THE DRAWINGS

Preferred embodiments will be described, and the described characteristics, technical features, advantages, and implementations of a full-azimuth irradiation tracking method, a detection apparatus, and a solar tracker will be further described below in a clear and understandable manner with reference to the drawings.

DETAILED DESCRIPTION OF THE EMBODIMENTS

In the following description, specific details such as a specific system configuration and a technology are provided for illustrative and not limitative purpose so as to facilitate the understanding the embodiments of the present application thorough. However, it should be appreciated by a person skilled in the art that the present application may be implemented in other embodiments without these specific details. In other circumstances, detailed descriptions of well-known systems, apparatuses, circuits, and methods are omitted to avoid unnecessary details from obscuring the description of the present application.

It should be understood that when used in this description and the appended claims, the term "comprise" indicates the presence of the described feature, integer, step, operation, element, and/or component, but does not exclude the presence or addition of one or more other features, integers, steps, operations, elements, components, and/or groups.

In order to make the drawings brief, each figure only schematically shows parts related to the present invention, which do not represent actual structures of the products. In addition, in order to make the drawings brief and easy to understand, in some drawings, only one of the parts having the same structure or function are schematically illustrated, or only one of them is marked. Herein, "one" not only means "only one", but also means "more than one".

It should be further understood that the term "and/or" used in this description and the appended claims refers to and includes any combination and all possible combinations of one or more of the associated listed items.

In addition, in the description of the present application, the terms "first", "second" and the like are only used for distinguishing the description, and cannot be understood as indicating or implying relative importance.

In order to clearly illustrate the technical solutions in the embodiments of the present invention or in the prior art, the specific embodiments of the present invention will be described below with reference to the drawings. Obviously, the drawings in the following description only relate to some embodiments of the present invention, and a person skilled in the art may obtain other drawings according to these drawings and obtain other embodiments without any creative effort.

Figure 1:
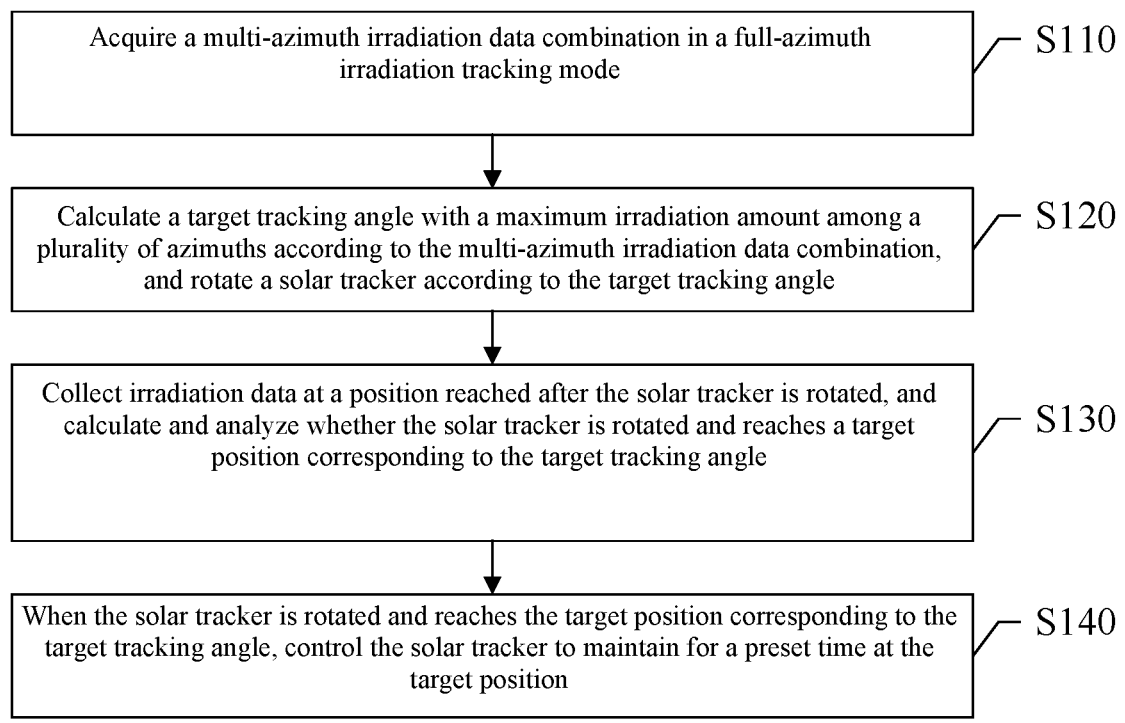
FIG. 1 is a schematic diagram of one embodiment of a full-azimuth irradiation tracking method in the present invention.

An embodiment of the present invention, as shown in FIG. 1, provides a full-azimuth irradiation tracking method, comprising:

S110: Acquire a multi-azimuth irradiation data combination in a full-azimuth irradiation tracking mode.

Specifically, a full-azimuth irradiation detection apparatus in the present invention is internally provided with a plurality of reference cells, the reference cells are sensing elements capable of detecting solar irradiation data, such as silicon cells, and the current values output by the silicon cells can be corrected to an irradiation amount. The number of reference cells can be 4n such as 4, 8, 12 . . . . The more reference cells, the higher the data accuracy. A multi-azimuth irradiation data combination is obtained by means of the full-azimuth detection apparatus, so as to calculate an optimal tracking angle of an irradiation amount in a plurality of azimuths.

S120: Calculate a target tracking angle with a maximum irradiation amount among a plurality of azimuths according to the multi-azimuth irradiation data combination, and rotate a solar tracker according to the target tracking angle.

Specifically, after the multi-azimuth irradiation data combination is obtained by means of the full-azimuth irradiation detection apparatus, the maximum irradiation data combination is determined, a corresponding optimal tracking angle is calculated, and a target position is provided, wherein the optimal tracking angle is a target angle required; and a solar tracker is rotated and reaches the target position so that the solar tracker acquires the irradiation amount of the target position.

S130: Collect irradiation data at a position reached after the solar tracker is rotated, and calculate and analyze whether the solar tracker is rotated and reaches a target position corresponding to the target tracking angle.

Specifically, the solar tracker is rotated and may not reach a target position. In order to avoid this situation, it is necessary to collect irradiation data at a position reached after the solar tracker is rotated, recalculate the irradiation data of the solar tracker, and verify whether the solar tracker reaches an optimal irradiation angle position.

S140: When the solar tracker is rotated and reaches the target position corresponding to the target tracking angle, control the solar tracker to maintain for a preset time at the target position.

Specifically, after the irradiation data of the solar tracker is verified, if the solar tracker reaches an optimal irradiation angle position, the solar tracker maintains at a target angle, and an optimal tracking angle position of the solar tracker is recalculated after a period of time t (for example, 2 min), wherein the optimal tracking angle position is a target angle.

Optionally, after calculating and analyzing whether the solar tracker rotates and reaches the target position corresponding to the target tracking angle, the method comprises: when the solar tracker is rotated and does not reach the target position corresponding to the target tracking angle, recalculating a target tracking angle, and adjusting the position of the solar tracker; and/or; after controlling the solar tracker to maintain for a preset time at the target position, recalculating a target tracking angle, and adjusting the position of the solar tracker.

Specifically, after the irradiation data of the solar tracker is verified, if the solar tracker does not reach an optimal irradiation angle position, the optimal tracking angle position of the solar tracker is recalculated, wherein the optimal tracking angle position is the target angle.

Figure 5:
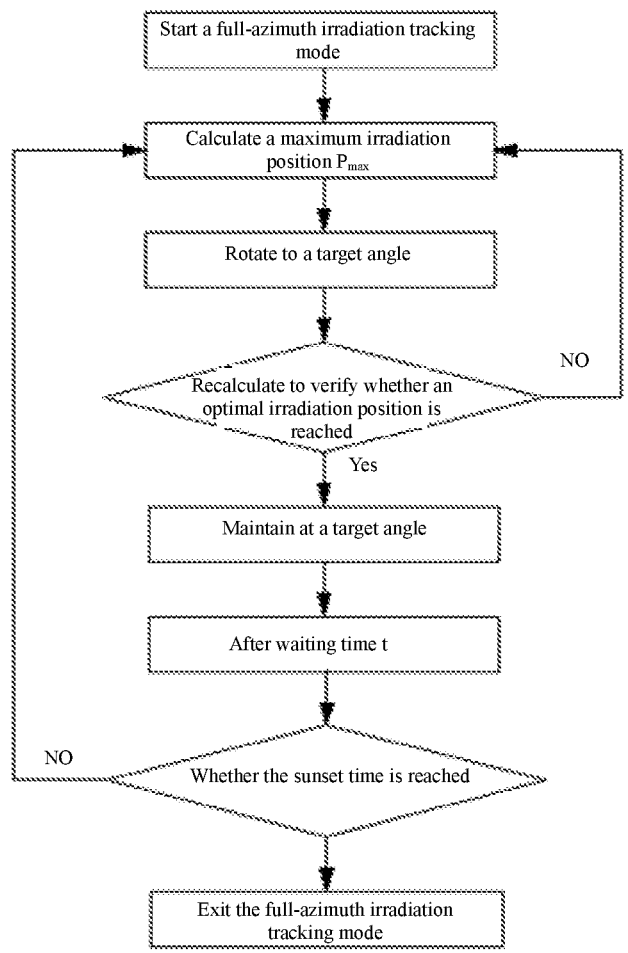
FIG. 5 is a flow diagram of another embodiment of a full-azimuth irradiation tracking method in the present invention.

Exemplarily, as shown in FIG. 5, a plurality of groups of angle and azimuth irradiation data are first acquired by means of a full-azimuth irradiation apparatus; a maximum irradiation data combination is determined, a position corresponding to an optimal tracking angle is calculated, and a target angle is provided; the tracker is rotated and reaches a target optimal angle position; and the irradiation value is recalculated to verify whether the optimal position is reached, if the optimal irradiation angle position is not reached, the optimal tracking angle position is recalculated, and if the optimal position is reached and the target angle is maintained, the optimal tracking angle position is recalculated after a period of time t (for example, 2 min).

Figure 2:
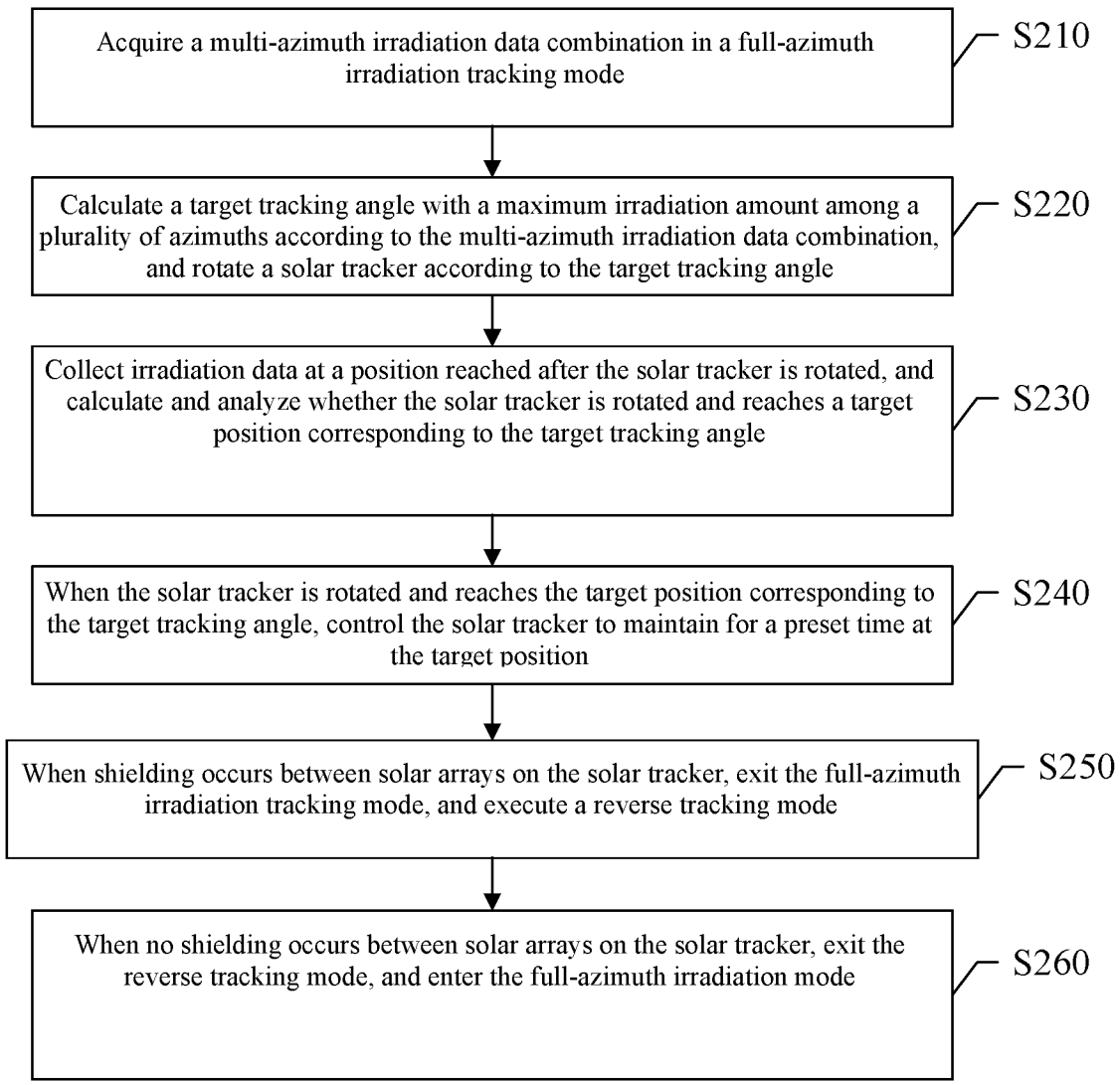
FIG. 2 is a schematic diagram of another embodiment of a full-azimuth irradiation tracking method in the present invention.

Another embodiment of the present invention, as shown in FIG. 2, a full-azimuth irradiation tracking method, comprising:

S210: Acquire a multi-azimuth irradiation data combination in a full-azimuth irradiation tracking mode.

S220: Calculate a target tracking angle with a maximum irradiation amount among a plurality of azimuths according to the multi-azimuth irradiation data combination, and rotate a solar tracker according to the target tracking angle.

S230: Collect irradiation data at a position reached after the solar tracker is rotated, and Calculate and analyze whether the solar tracker is rotated and reaches a target position corresponding to the target tracking angle.

S240: When the solar tracker is rotated and reaches the target position corresponding to the target tracking angle, control the solar tracker to maintain for a preset time at the target position.

S250: When shade occurs between solar arrays on the solar tracker, exit the full-azimuth irradiation tracking mode, and execute a back tracking mode.

Specifically, when a solar elevation angle is at a certain value and the angle of an panel is at a certain value, a rotating panel correspondingly has a critical value for shadow generation. According to the local longitude and latitude, real-time time, in combination with an astronomical algorithm and a current angle of the panel, a current shadow value can be calculated by means of the astronomical algorithm. If the current shadow value exceeds the critical value for shadow generation, shade occurs between the solar arrays on the solar tracker. In general, shade tends to occur between solar arrays on the solar trackers from the evening to morning or on a hillside.

Exemplarily, shade is avoided by means of the astronomical algorithm, and a back tracking mode is started to avoid shade in the early evening. Alternatively, when shade occurs on a hillside, as long as the slope is input into the system, the angle will be corrected so as to avoid shade.

S260: When no shade occurs between solar arrays on the solar tracker, exit the back tracking mode, and enter the full-azimuth irradiation mode.

Specifically, the full-azimuth irradiation tracking mode can be used in combination with the back tracking mode, shadow shade in the solararray is avoided by back tracking in the morning and evening, and the full-azimuth irradiation detection mode is used for tracking at other times. After sunrise, the solar tracker first starts the back tracking mode until it reaches the end time of the back tracking mode in the morning; and in the afternoon, when shade will occur between solararrays on the solar tracker, the solar tracker exits the full-azimuth irradiation tracking mode, and enters the back tracking mode.

Figure 6:
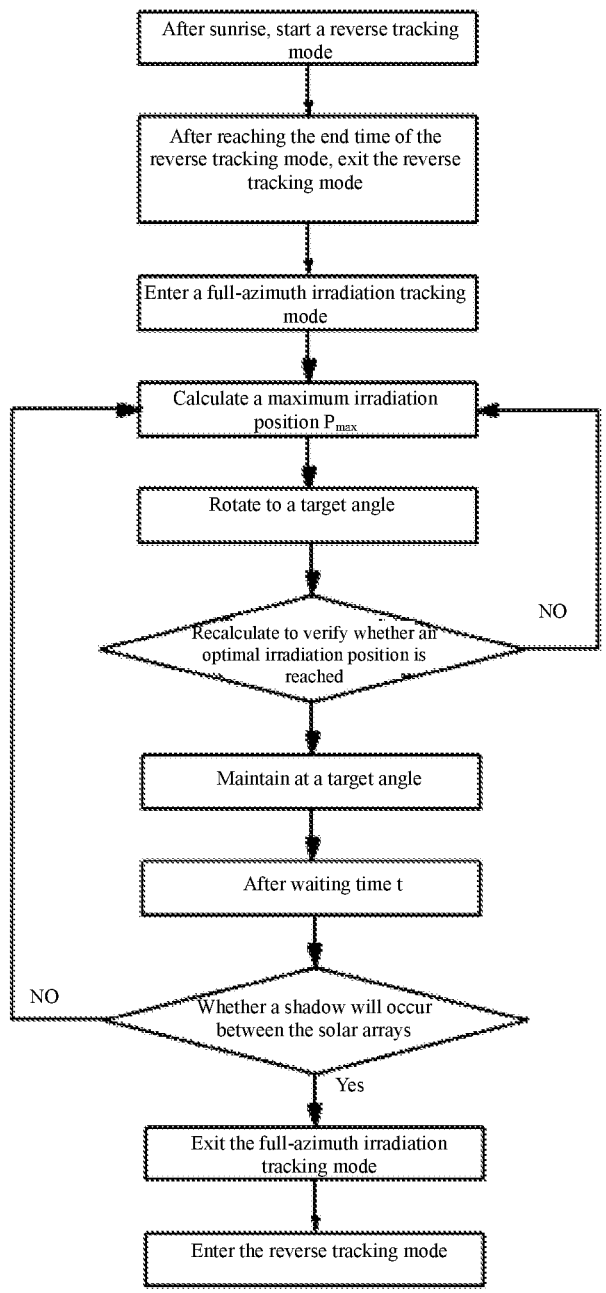
FIG. 6 is a flow diagram of another embodiment of a full-azimuth irradiation tracking method in the present invention.

Exemplarily, as shown in FIG. 6, after sunrise, the tracer first starts the back tracking mode until it reaches the end time of the back tracking mode in the morning, exits the back tracking mode, and enters the full-azimuth irradiation tracking mode; a plurality of groups of angle and azimuth data is first acquired by means of a full-azimuth irradiation apparatus; a maximum irradiation data combination is determined, a position corresponding to an optimal tracking angle is calculated, and a target angle is provided; the tracker is rotated and reaches a target optimal angle position; and the irradiation value is recalculated to verify whether the optimal position is reached, if the optimal irradiation angle position is not reached, the optimal tracking angle position is recalculated, and if the optimal position is reached and the target angle is maintained, the optimal tracking angle position is recalculated after a period of time t (for example, 2 min); and when shade will occur between the solar arrays in the afternoon, a multi-angle irradiation tracking mode is exited, and the back tracking mode is entered.

By means of the solution, a full-azimuth irradiation tracking method for different weather can be achieved, thereby avoiding the problem of inaccurate irradiation tracking caused by weather, and improving the power generation amount.

Figure 3:
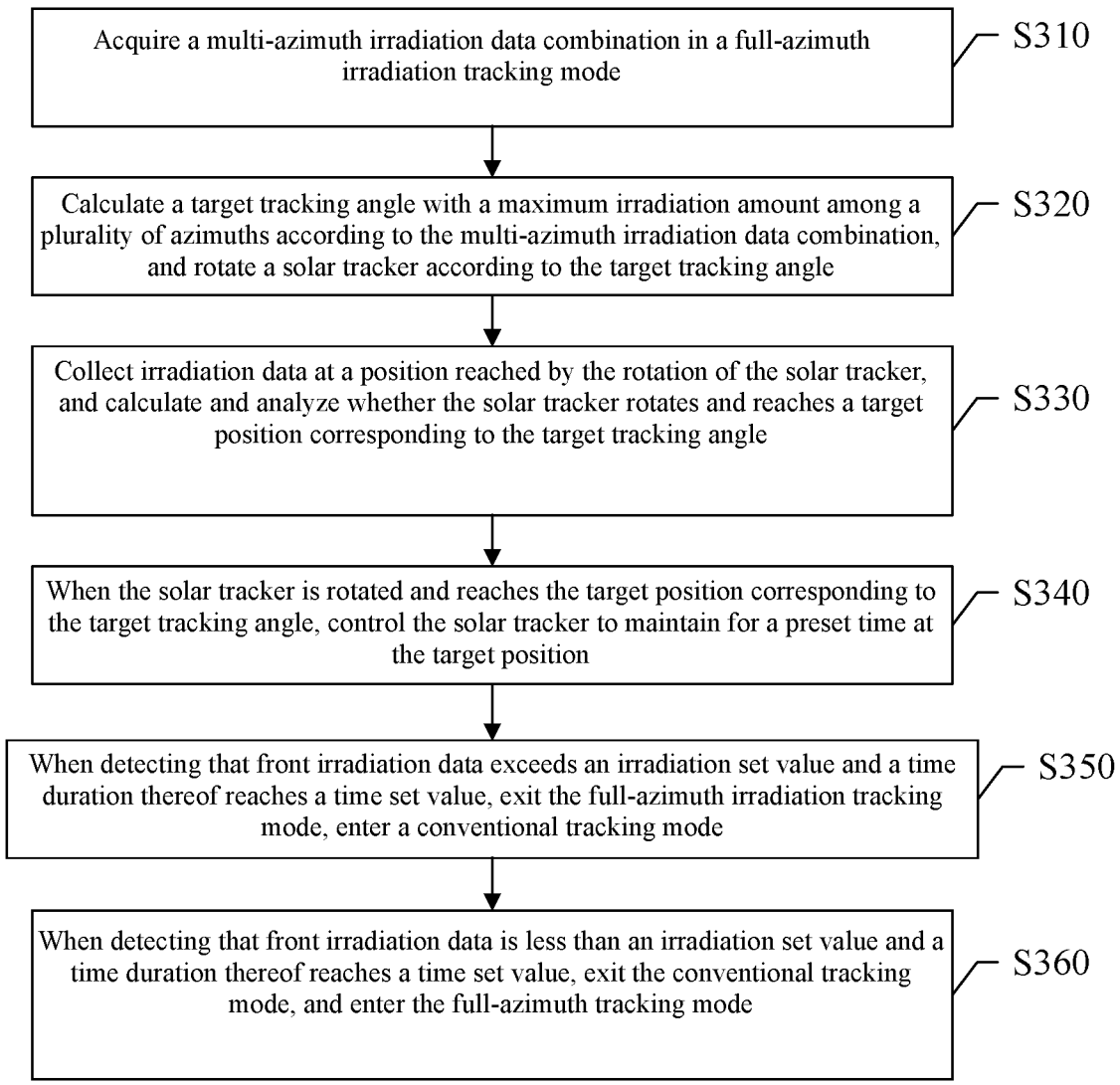
FIG. 3 is a schematic diagram of another embodiment of a full-azimuth irradiation tracking method in the present invention.

Another embodiment of the present invention, as shown in FIG. 3, a full-azimuth irradiation tracking method, comprising:

S310: Acquire a multi-azimuth irradiation data combination in a full-azimuth irradiation tracking mode.

S320: Calculate a target tracking angle with a maximum irradiation amount among a plurality of azimuths according to the multi-azimuth irradiation data combination, and rotate a solar tracker according to the target tracking angle.

S330: Collect irradiation data at a position reached by the rotation of the solar tracker, and calculate and analyze whether the solar tracker rotates and reaches a target position corresponding to the target tracking angle.

S340: When the solar tracker is rotated and reaches the target position corresponding to the target tracking angle, control the solar tracker to maintain for a preset time at the target position.

S350: When detecting that front irradiation data exceeds an irradiation set value and a time duration thereof reaches a time set value, exit the full-azimuth irradiation tracking mode, enter a conventional tracking mode.

S360: When detecting that front irradiation data is less than a set value irradiation and a time duration thereof reaches a set value time, exit the conventional tracking mode, and enter the full-azimuth tracking mode.

Specifically, the full-azimuth irradiation tracking mode can be used in combination with the conventional tracking mode (for example, an astronomical algorithm mode, or an astronomical algorithm+inclination angle sensor mode) so as to optimize a tracking angle on a non-sunny day, and the steps of the tracking method comprises: monitoring irradiation data at various angles in real time, when monitoring that the front irradiation $R_{front}$ is less than a set value $R_s$ and a time duration thereof reaches a set value $T_{start}$ (for example, it can be set that $R_s$ is 200 W/m² and $T_{start}$ is 5 min), the conventional tracking mode is exited, and the full-azimuth irradiation tracking mode is entered; and when the front irradiation $R_{front}$ exceeds a set value $R_s$ and a time duration thereof reaches a set value Tend (for example, it can be set that $R_s$ is 200 W/m² and Tend is 3 min), a multi-angle irradiation tracking mode is exited, and the conventional tracking mode is entered.

Figure 7:
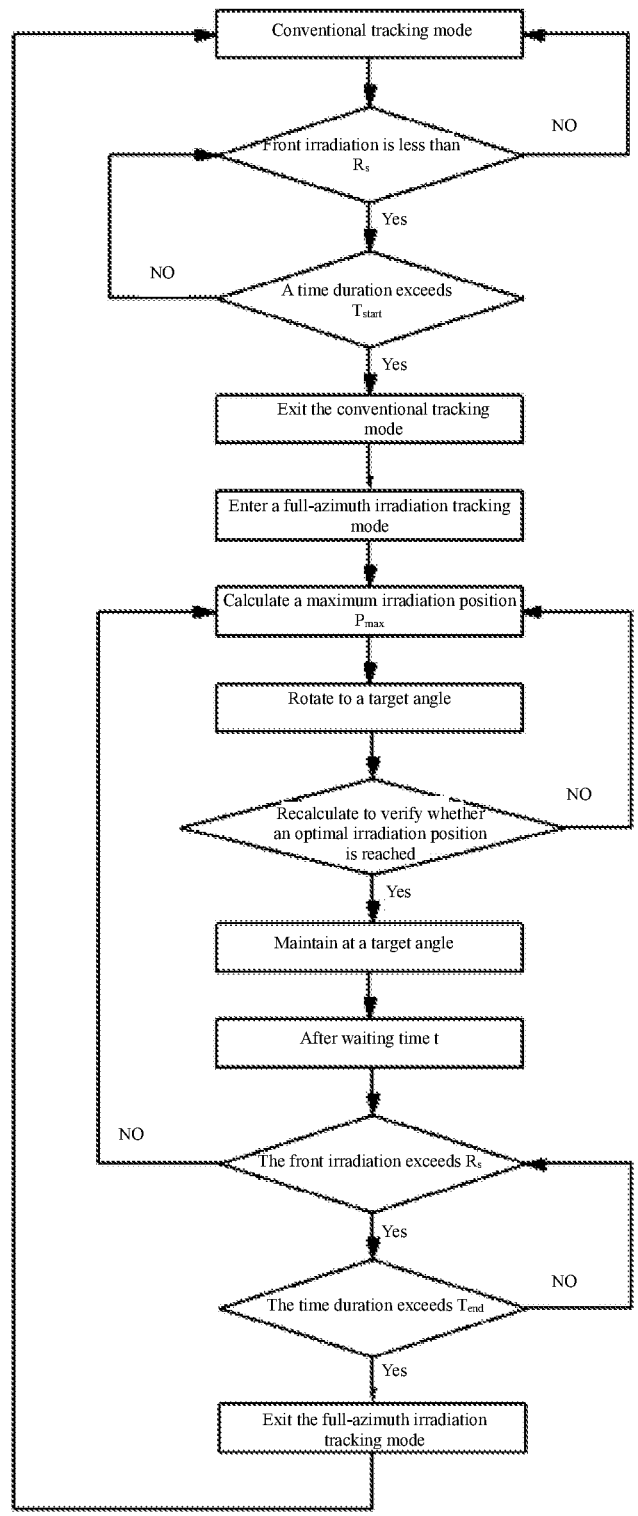
FIG. 7 is a flow diagram of another embodiment of a full-azimuth irradiation tracking method in the present invention.

Exemplarily, as shown in FIG. 7, the full-azimuth irradiation detection can be used in combination with a conventional tracking mode (for example, an astronomical algorithm tracking mode), and the steps are as follows: usually, a tracker adopts a conventional tracking mode, monitors environmental irradiation data in real time by means of a full-azimuth irradiation apparatus; when monitoring that front irradiation is less than a set value and a time duration thereof reaches the set value, the conventional tracking mode is exited; a full-azimuth irradiation tracking mode is entered, and a plurality of groups of angle and azimuth irradiation data by means of a full-azimuth irradiation apparatus; a maximum irradiation data combination is determined, a position corresponding to an optimal tracking angle is calculated, and a target angle is provided; after the tracker rotates and reaches the target optimal angle position, the irradiation value is recalculated to verify whether the optimal position is reached; and when the full-azimuth irradiation apparatus monitors that the front irradiation exceeds the set value and the time duration thereof reaches the set value, the full-azimuth irradiation tracking mode is exited, and the conventional tracking mode is entered.

Figure 4:
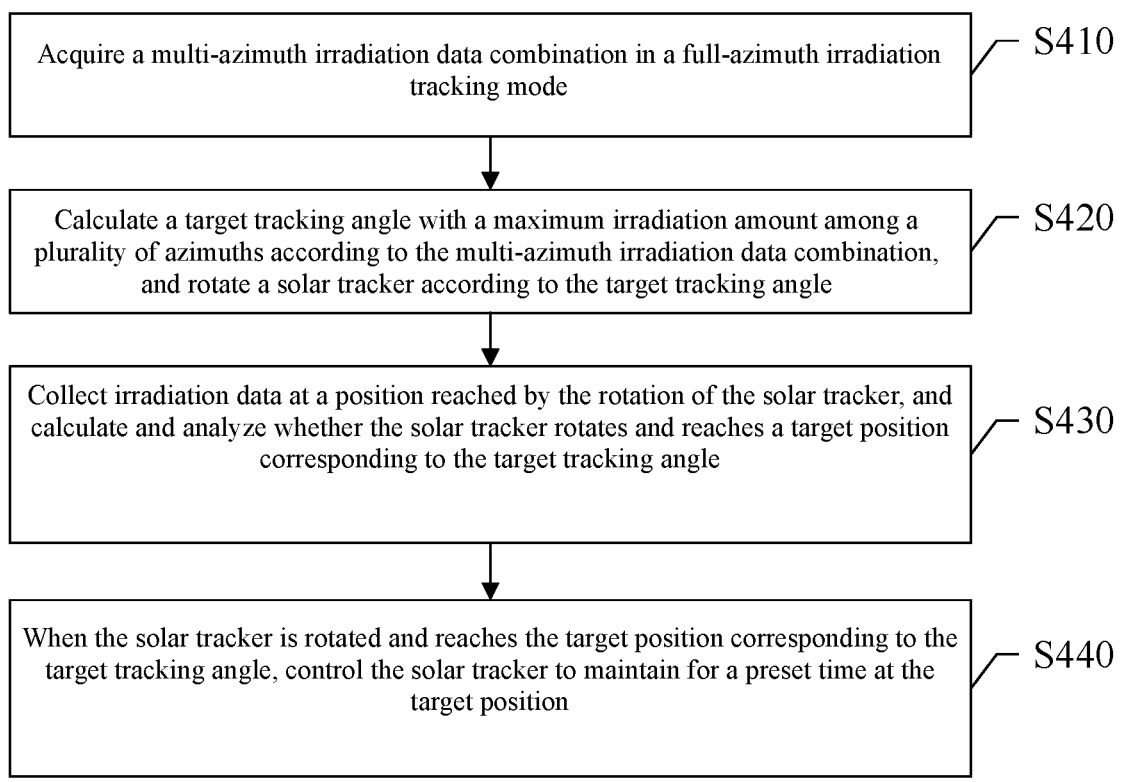
FIG. 4 is a schematic diagram of another embodiment of a full-azimuth irradiation tracking method in the present invention.

Another embodiment of the present invention, as shown in FIG. 4, a full-azimuth irradiation tracking method, comprising:

S410: Acquire a multi-azimuth irradiation data combination in a full-azimuth irradiation tracking mode.

Specifically, the irradiation data $R_1, R_2, \ldots, R_i, R_{4n}$ of the 4n angle positions comprising the irradiation data of the front $R_1$, the back $R_{n+1}$, the left $R_{2n+1}$, the right $R_{3n+1}$ and other azimuths are acquired by means of the reference cells inside the full-azimuth irradiation detection apparatus. The reference cells can be a silicon solar cell, and a current signal output value of the cell can be subjected to temperature correction and then be converted into an irradiation value.

S420: Calculate a target tracking angle with a maximum irradiation amount among a plurality of azimuths according to the multi-azimuth irradiation data combination, and rotate a solar tracker according to the target tracking angle.

Wherein, the calculating a target tracking angle with a maximum irradiation amount among the plurality of azimuths according to the multi-azimuth irradiation data combination comprises:

when the tracking angle has a limited range of a rotation angle range x not exceeding 90°, 120°, or 150°, calculating a target tracking angle with a maximum irradiation amount among a plurality of azimuths by using the following calculation formulae:

when $R_i > R_{2n+i}$, $P_i = \alpha * R_i + \beta * \eta * R_{2n+i}$, wherein $i < n*x < 180$; and when $R_i < R_{2n+i}$, $P_i = \alpha * \eta * R_i + \beta * R_{2n+i}$, wherein $i < n*x < 180$; and when the tracking angle has no range limitation, calculating a target tracking angle with a maximum irradiation amount among a plurality of azimuths by using the following calculation formulae:

when $R_i > R_{2n+i}$, $P_i = \alpha * R_i + \beta * \eta * R_{2n+i}$; and when $R_i < R_{2n+i}$, $P_i = \alpha * \eta * R_i + \beta * R_{2n+i}$;

wherein, the azimuth i and the azimuth 2n+i are relative azimuth, $R_i$ represents an irradiation amount of the azimuth i, $R_{2n+i}$ represents an irradiation amount of the azimuth 2n+i, α and β represent irradiation correction coefficients, η represents a bifacial rate, and a maximum value of the tracking angle $P_i$ is set to be $P_{max}$ Max($P_1, P_2, \ldots, P_i, P_{2n+1}$), wherein i=max corresponding to $P_{max}$ is taken as a target tracking angle.

Wherein, the solar tracker rotating according to the target tracking angle specifically comprises: the rotation angle and the rotation direction of the solar tracker are respectively as follows:

the rotation angle is expressed as: ω=90*max/n; and the rotation direction is expressed as: when $R_i > R_{2n+i}$, the solar tracker is rotated from the direction $R_1$ to the direction $R_i$; otherwise, the solar tracker is rotated from the direction $R_1$ to the direction $R_{2n+i}$.

Specifically, after an irradiation value of each azimuth plane is calculated, an angle corresponding to an optimal irradiation amount is determined, and the angle is an optimal tracking angle position. If the tracking angle has no range limitation, the following calculation formulae are:

when $R_i > R_{2n+i}$, $P_i = \alpha * R_i + \beta * \eta * R_{2n+i}$; and when $R_i < R_{2n+i}$, $P_i = \alpha * \eta * R_i + \beta * R_{2n+i}$;

for example, if the tracking angle range has a limited range of a rotation angle x not exceeding 90°, or 120°, or 150°, the irradiation amount $R_i$ of $i < n*x < 180$ is calculated by the following formulae:

when $R_i > R_{2n+i}$, $P_i = \alpha * R_i + \beta * \eta * R_{2n+i}$; and when $R_i < R_{2n+i}$, $P_i = \alpha * \eta * R_i + \beta * R_{2n+i}$;

wherein the azimuth i and the azimuth 2n+i are relative azimuths, $R_i$ represents an irradiation amount of the azimuth i, $R_{2n+i}$ represents an irradiation amount of the azimuth 2n+i, α and β represent irradiation correction coefficients, η represents a bifacial rate, and the maximum value of the tracking angle $P_i$ is set to be $P_{max}$ Max($P_1, P_2, \ldots, P_i, P_{2n+1}$), wherein i=max corresponding to $P_{max}$ is taken as the target tracking angle.

After receiving the target angle, a tracker control system sends an instruction to drive a motor to rotate, so that the tracker reaches the target tracking angle position, verifies the irradiation data collected at this position, and determines whether the optimal position is reached by means of a calculation result. Wherein, the rotating the solar tracker according to the target tracking angle specifically comprises: the rotation angle and the rotation direction of the solar tracker are respectively as follows:

the rotation angle is expressed as: ω=90*max/n; and the rotation direction is expressed as: when $R_i > R_{2n+i}$, the solar tracker is rotated from the direction $R_1$ to the direction $R_i$; otherwise, the solar tracker is rotated from the direction $R_1$ to the direction $R_{2n+i}$.

S430: Collect irradiation data at a position reached by the rotation of the solar tracker, and calculate and analyze whether the solar tracker rotates and reaches a target position corresponding to the target tracking angle.

S440: When the solar tracker is rotated and reaches the target position corresponding to the target tracking angle, control the solar tracker to maintain for a preset time at the target position.

Specifically, the irradiation value is recalculated to verify whether the optimal position is reached, if the optimal irradiation angle position is not reached, the optimal tracking angle position is recalculated, and if the optimal position is reached and the target angle is maintained, the optimal tracking angle position is recalculated after a period of time t (for example, 2 min).

Figure 8:
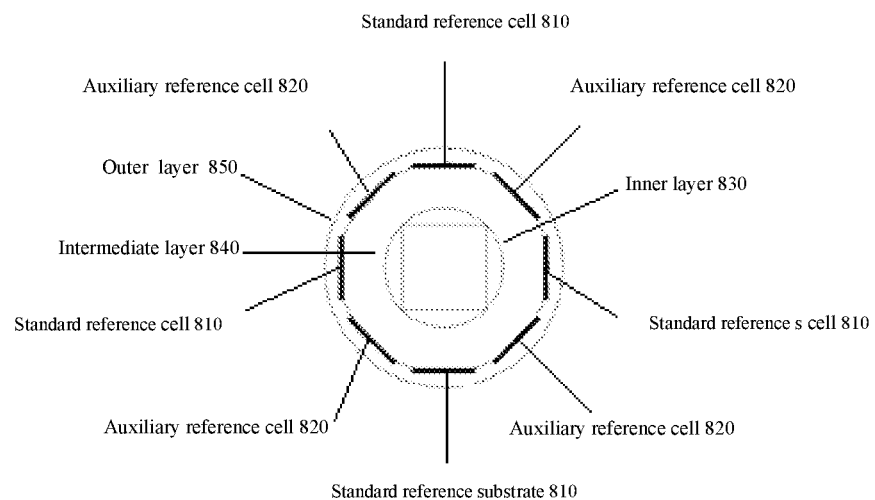
FIG. 8 is a structural schematic diagram of a full-azimuth irradiation detection apparatus in the present invention.

The present invention provides a full-azimuth irradiation detection apparatus, as shown in FIG. 8, comprising:

A plurality of reference cells used for measuring irradiation data in a plurality of azimuths and mounted on a peripheral side of a rotating main shaft of a solar tracker. Wherein, the plurality of reference cells comprise: a plurality of standard reference cells 810, respectively mounted on the peripheral side of the rotating main shaft of the solar tracker and on the horizontal or vertical position of the rotating main shaft; and a plurality of auxiliary reference cells 820, respectively mounted on the peripheral side of the rotating main shaft of the solar tracker and located between two standard reference cells 810.

Specifically, a full-azimuth irradiation detection device comprises: an inner layer 830, the inner layer 830 being a first flexible material, being provided on a torus adjacent to the rotating main shaft, and being in clearance fit with the rotating main shaft; an intermediate layer 840, the intermediate layer 840 being a second flexible material, the plurality of reference cells being distributed on the intermediate layer 840, the second flexible material having a strength greater than that of the first flexible material; and an outer layer 850, the outer layer 850 being a transparent material having a self-cleaning function, and the outer layer 850 and the intermediate layer 840 being hollow or filled with a transparent material.

Specifically, a full-azimuth irradiation detection apparatus is internally provided with the plurality of reference cells, the reference cells are sensing elements capable of detecting solar irradiation, such as silicon cells, and the current values output by the silicon cells can be converted into an irradiation amount. The number of reference cells can be 4n such as 4, 8, 12 . . . . The more reference cells, the higher the data accuracy. The irradiation detection apparatus is mounted on a rotating main shaft of a tracker, four of which are standard reference cells, wherein the two standard reference cells are respectively parallel to two horizontal positions of the main shaft and measure front and back irradiations, the other two standard reference cells are respectively perpendicular to the horizontal positions of the main shaft and measure left and right irradiations, and the other standard reference cells symmetrically measure the irradiation amount of each azimuth position.

An aperture capable of accommodating the main shaft to pass through is provided at the center of the irradiation detection apparatus. The torus of the irradiation detection apparatus adjacent to the main shaft is a flexible material, and can randomly accommodate main beams having different shapes. The reference cells are distributed in an intermediate layer, and the intermediate layer is a flexible material having a certain strength. The outer layer is a transparent material having a self-cleaning function, and the outer layer and the intermediate layer may be hollow or filled with a transparent material.

Figure 9:
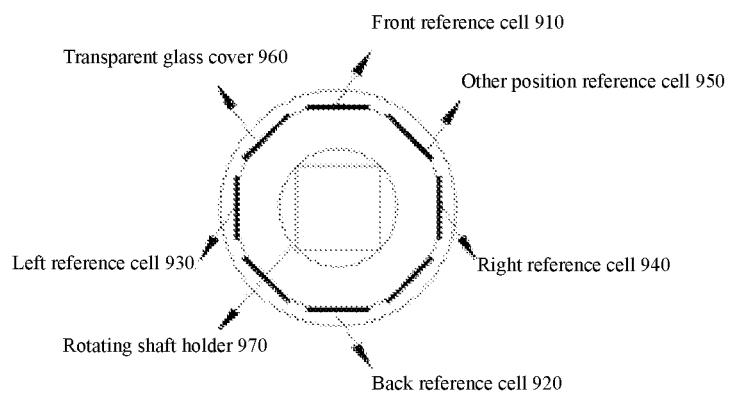
FIG. 9 is a structural schematic diagram of a full-azimuth irradiation detection apparatus comprising eight azimuth reference cells in the present invention.
Figure 10:
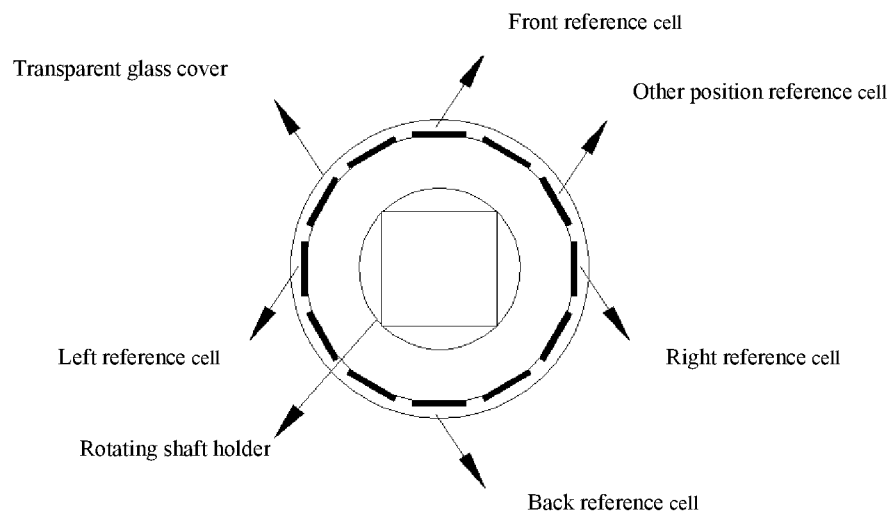
FIG. 10 is a structural schematic diagram of a full-azimuth irradiation detection apparatus comprising twelve azimuth reference cells in the present invention.
Figure 11:
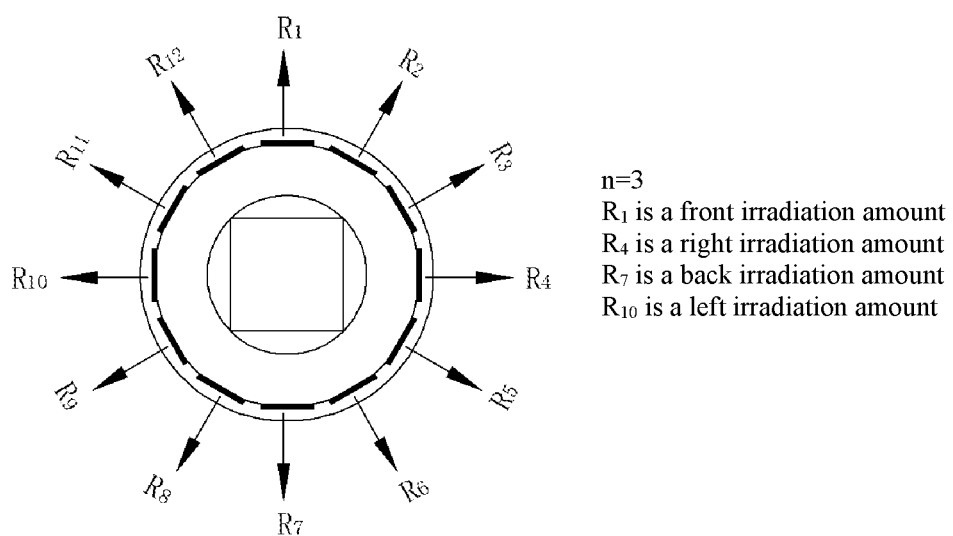
FIG. 11 is a structural schematic diagram of a full-azimuth irradiation detection apparatus comprising 4n azimuth reference cells in the present invention.

Exemplarily, as shown in FIG. 9, a full-azimuth irradiation detection apparatus comprising eight azimuth reference cells specifically comprises a front reference substrate 910, a back reference substrate 920, a left reference substrate 930, a right reference substrate 940, other position reference substrate 950, a transparent glass cover 960, and a rotating shaft holder 970. Exemplarily, as shown in FIG. 10, a full-azimuth irradiation detection apparatus comprising twelve azimuth reference cells. Exemplarily, as shown in FIG. 11, an full-azimuth irradiation detection apparatus (n=3) comprising 4n azimuth reference cells, $R_1$ is a front irradiation amount, $R_4$ is a right irradiation amount, $R_7$ is a back irradiation amount, $R_{10}$ is a left irradiation amount, $R_2$, $R_3$, $R_5$, $R_6$, $R_8$, $R_9$, $R_{11}$, $R_{12}$ are other azimuth irradiation amounts.

The present invention provides a solar tracker, wherein a full-azimuth irradiation detection apparatus is mounted on a rotating main shaft of the solar tracker.

According to a full-azimuth irradiation tracking method, a detection apparatus and a solar tracker provided by the present invention, a plurality of angle reference cells are provided on the full-azimuth irradiation detection apparatus, and mounted as a whole at a certain symmetry interval, a plurality of groups of irradiation data can be acquired, and the rotation angle of the solar tracker is provided by calculating the irradiance data, improving the existing solar tracking mode, especially being able to enable the bifacial panel and the tracking solar power station to achieve an optimal tracking mode in various weather.

It can be clearly understood by a person skilled in the art that, for the convenience and simplicity of the description, only the division of the foregoing program panels is described by way of example. In practical applications, the foregoing functions can be allocated to different program panels for implementation according to requirements, that is, the internal structure of the apparatus is divided into different program units or panels to implement all or part of the functions described above. The program panels in the embodiments can be integrated in one processing unit, or the units can be physically and individually present, or two or more units are integrated in one processing unit. The integrated unit can be implemented in a form of hardware, or can also be implemented in a form of a software program unit. In addition, specific names of the program panels are only for the convenience of distinguishing from each other, and are not intended to limit the scope of protection of the present application.

In the foregoing embodiments, descriptions of the embodiments are focused on each other, and for a part that is not described or described in detail in a certain embodiment, reference can be made to related descriptions of other embodiments.

A person skilled in the art should realized that various units and algorithm steps of the examples described in combination with the disclosed embodiments herein can be implemented in an electronic hardware, or a combination of the computer software and an electronic hardware. Whether the functions are executed by a hardware or a software depends on particular applications and design constraint conditions of the technical solutions. A person skilled in the art can implement the described functions in different methods for particular applications, but the implementation should not be considered as going beyond the scope of the present application.

In the embodiments provided in the present application, it should be understood that the disclosed apparatus and method may be implemented in other manners. Exemplarily, the apparatus embodiment described above is only exemplary. The division of the panels or units is only a logical function division, and may be other division manners in actual implementation. Exemplarily, a plurality of units or assemblies may be combined or integrated into another system, or some features may be ignored or not executed. In addition, the displayed or discussed mutual couplings or direct couplings or communication connections may be implemented by means of some interfaces. The indirect couplings or communication connections between the apparatuses or units may be implemented in electronic, mechanical, or other forms.

The units described as separating components may or may not be physically separate, and components described as units may or may not be physical units, may be located in one location, or may be distributed on a plurality of network units. A part or all of the units may be selected according to actual requirements to achieve the objectives of the solutions of the embodiments.

In addition, functional units in the embodiments of the present application may be integrated in one processing unit, or various units can be physically and individually present, or two or more units are integrated into one unit. The integrated unit may be implemented in the form of a hardware, and may also be implemented in the form of a software functional unit.

It should be noted that the described embodiments can be freely combined as required. Described above are the preferred embodiments of the present disclosure. It should be noted that a person skilled in the related art may make several improvements and modifications without departing from the principle of the present invention, and these improvements and modifications shall be intended to be within the scope of protection of the present invention.

The invention claimed is:

1. A full-azimuth irradiation tracking method, comprising:
    acquiring a multi-azimuth irradiation data combination in a full-azimuth irradiation tracking mode;
    calculating a target tracking angle with a maximum irradiation amount among a plurality of azimuths according to the multi-azimuth irradiation data combination, and rotating a solar tracker according to the target tracking angle;
    collecting irradiation data at a position reached after the solar tracker rotates, and calculating and analyzing whether the solar tracker reaches a target position corresponding to the target tracking angle; and when the solar tracker reaches the target position corresponding to the target tracking angle, controlling the solar tracker to maintain for a preset time at the target position.

2. The full-azimuth irradiation tracking method according to claim 1, wherein after calculating and analyzing whether the solar tracker reaches a target position corresponding to the target tracking angle, comprising:
when the solar tracker is rotated and does not reach the target position corresponding to the target tracking angle, recalculating a target tracking angle, and adjusting the position of the solar tracker;
and/or;
after controlling the solar tracker to maintain for a preset time at the target position, recalculating a target tracking angle, and adjusting the position of the solar tracker.

3. The full-azimuth irradiation tracking method according to claim 1, further comprising:
when shade occurs between solar arrays on the solar tracker, exiting the full-azimuth irradiation tracking mode, and executing a back tracking mode;
or;
when detecting that front irradiation data exceeds a set value irradiation and a time duration thereof reaches a set value time, exiting the full-azimuth irradiation tracking mode, and entering a conventional tracking mode.

4. The full-azimuth irradiation tracking method according to claim 3, further comprising:
when no shade occurs between solar arrays on the solar tracker, exiting the back tracking mode, and entering the full-azimuth irradiation mode;
or
when detecting that front irradiation data is less than a set value irradiation and a time duration thereof reaches a set value time, exiting the conventional tracking mode, and entering the full-azimuth tracking mode.

5. The full-azimuth irradiation tracking method according to claim 1, wherein calculating a target tracking angle with a maximum irradiation amount among a plurality of azimuths according to the multi-azimuth irradiation data combination comprises:
when the tracking angle has a limited range of a rotation angle range x not exceeding 90°, or 120°, or 150°, calculating a target tracking angle with a maximum irradiation amount among a plurality of azimuths by using the following calculation formulae:
when $R_i > R_{2n+i}$, $P_i = \alpha * R_i + \beta * \eta * R_{2n+i}$, wherein $i < n*x < 180$; and
when $R_i < R_{2n+i}$, $P_i = \alpha * \eta * R_i + \beta * R_{2n+i}$, wherein $i < n*x < 180$; and
when the tracking angle has no range limitation, calculating a target tracking angle with a maximum irradiation amount among a plurality of azimuths by using the following calculation formulae:

when $R_i > R_{2n+i}$, $P_i = \alpha * R_1 + \beta * \eta * R_{2n+i}$; and
when $R_i < R_{2n+i}$, $P_i = \alpha * \eta * R_i + \beta * R_{2n+i}$;
wherein the azimuth i and the azimuth 2n+i are relative azimuths, $R_i$ represents an irradiation amount of the azimuth i, $R_{2n+i}$ represents an irradiation amount of the azimuth 2n+i, $\alpha$ and $\beta$ represent irradiation correction coefficients, $\eta$ represents a bifacial efficiency, and the maximum value of the tracking angle $P_i$ is set to be $P_{max} = Max(P_1, P_2, \ldots, P_i, P_{2n+1})$, wherein i=max corresponding to $P_{max}$ is taken as the target tracking angle.

6. The full-azimuth irradiation tracking method according to claim 1, wherein rotating the solar tracker according to the target tracking angle specifically comprises:
the rotation angle and the rotation direction of the solar tracker are respectively as follows:
the rotation angle is expressed as: $\omega = 90 * max/n$; and
the rotation direction is expressed as: if $R_i > R_{2n+i}$, the solar tracker is rotated from the direction $R_1$ to the direction $R_i$; otherwise, the solar tracker is rotated from the direction $R_1$ to the direction $R_{2n+i}$.

7. A full-azimuth irradiation detection apparatus applied in the full-azimuth irradiation tracking method according to claim 1, comprising:
a plurality of reference cells, used for measuring irradiation data in a plurality of azimuths and mounted on a peripheral side of a rotating main shaft of a solar tracker.

8. The full-azimuth irradiation detection apparatus according to claim 7, wherein the plurality of reference cells comprise:
a plurality of standard reference cells, respectively mounted on the peripheral side of the rotating main shaft of the solar tracker and on the horizontal or vertical position of the rotating main shaft; and
a plurality of auxiliary reference cells, respectively mounted on the peripheral side of the rotating main shaft of the solar tracker and between the two standard reference cells.

9. The full-azimuth irradiation detection apparatus according to claim 7, further comprising:
an inner layer, the inner layer being a first flexible material, being provided on a torus adjacent to the rotating main shaft, and being in clearance fit with the rotating main shaft;
an intermediate layer, the intermediate layer being a second flexible material, the plurality of reference cells being distributed on the intermediate layer, the second flexible material having a strength greater than that of the first flexible material; and
an outer layer, the outer layer being a transparent material having a self-cleaning function, and the outer layer and the intermediate layer being hollow or filled with a transparent material.

10. A solar tracker, wherein the full-azimuth irradiation detection apparatus according to claim 7 is mounted on a rotating main shaft of the solar tracker.

* * * * *